Dec. 4, 1951    M. C. KRUEGER    2,577,660
SELECTIVE MANUAL CONTROL FOR AUTOMATIC
CHANGE SPEED TRANSMISSIONS

Filed Oct. 18, 1948    3 Sheets-Sheet 1

INVENTOR.
MARTIN C. KRUEGER
BY
ATTORNEY

Dec. 4, 1951 M. C. KRÜEGER 2,577,660
SELECTIVE MANUAL CONTROL FOR AUTOMATIC
CHANGE SPEED TRANSMISSIONS
Filed Oct. 18, 1948 3 Sheets-Sheet 2

INVENTOR.
MARTIN C. KRUEGER
BY
ATTORNEY

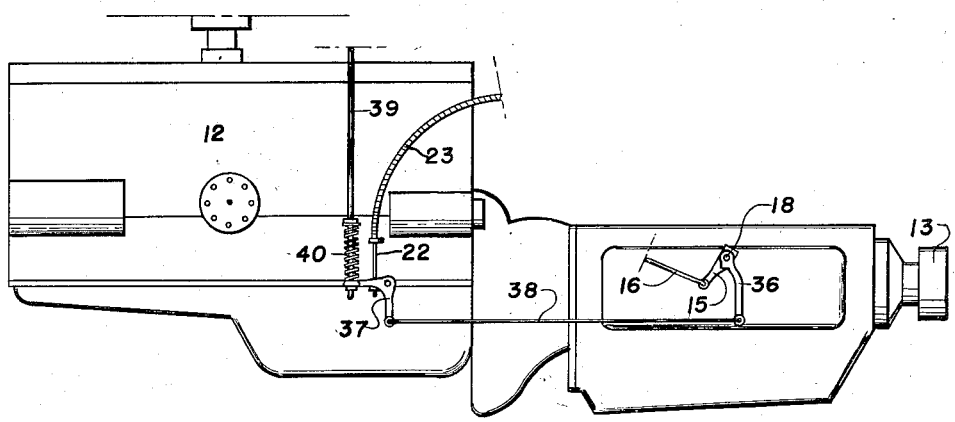
Fig. 6
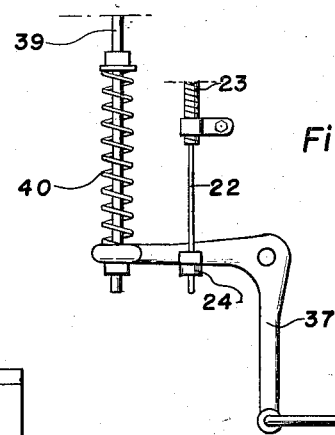
Fig. 7
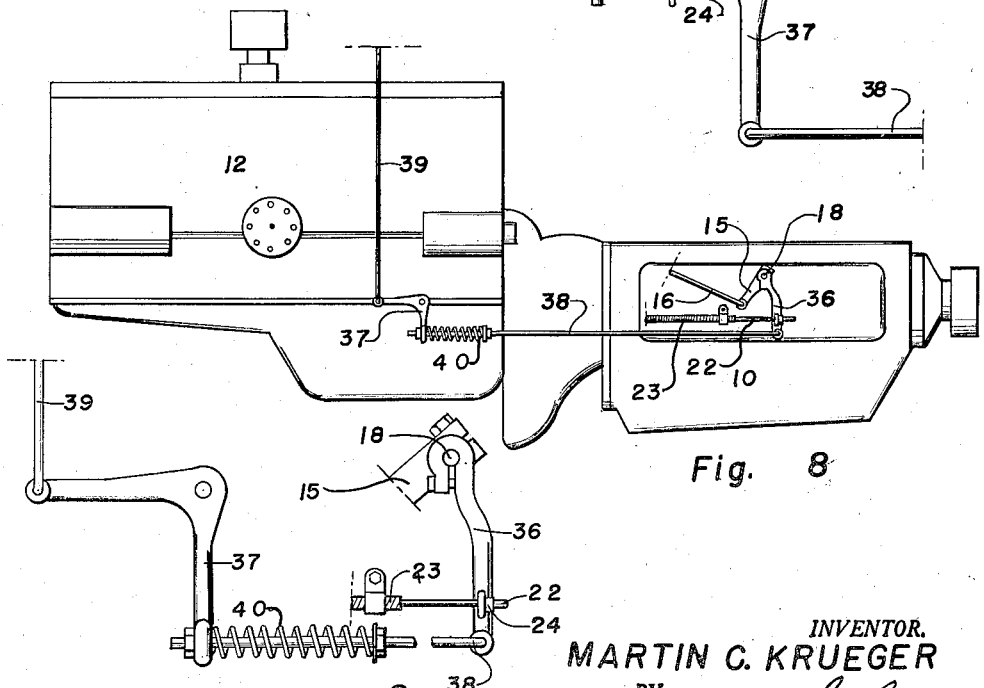
Fig. 8
Fig. 9
INVENTOR.
MARTIN C. KRUEGER
BY
ATTORNEY Patented Dec. 4, 1951

2,577,660

UNITED STATES PATENT OFFICE 2,577,660

SELECTIVE MANUAL CONTROL FOR AUTOMATIC CHANGE-SPEED TRANSMISSIONS

Martin C. Krueger, Idaho Springs, Colo.

Application October 18, 1948, Serial No. 55,168

4 Claims. (Cl. 74—472)

This invention relates to the operation and selective control of so-called "automatic" transmissions extensively employed, particularly in automotive vehicles, for the application of power from a prime mover to work effect through alternatively-engageable gear trains of differing ratios, and more particularly to a type and construction of automatic transmission characterized by the capacity to automatically engage a gear train of appropriate ratio in reaction to factors of driven element speed and prime mover operating speed as reflected through the throttle control positions thereof, and has as an object to provide an improved supplementary control for such transmissions selectively and manually operable to extend and enhance the operating practicability thereof.

A further object of the invention is to provide an improved supplementary control for automatically operated transmissions selectively and manually operable to inhibit automatic change of gear ratio therein within certain operating ranges thereof while preserving selective control of full prime mover operating speed range.

A further object of the invention is to provide an improved supplementary control for automatically operated transmissions susceptible of simple and convenient operative association with existing transmission installations.

A further object of the invention is to provide an improved supplementary control for automatically operated transmissions arranged for mounting exteriorly of and in operative association with such transmission units without alteration of the interior elements and relationships characterizing the unit.

With the foregoing and other objects in view, my invention consists in the construction, arrangement, and combination of elements hereinafter set forth, pointed out in my claims, and illustrated by the accompanying drawings, in which—

Figure 1:
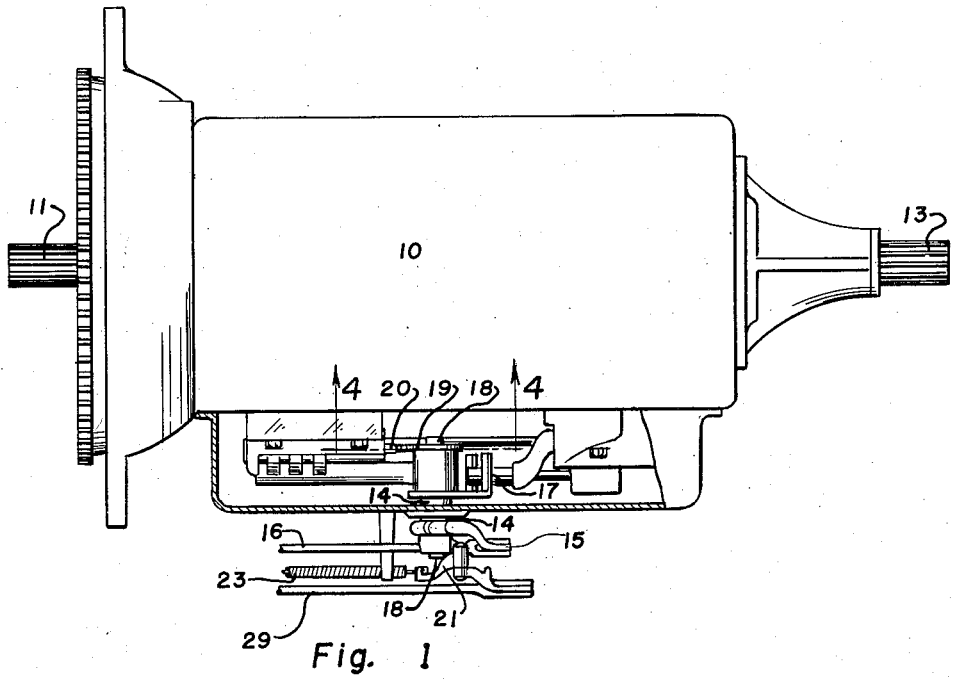
Figure 2:
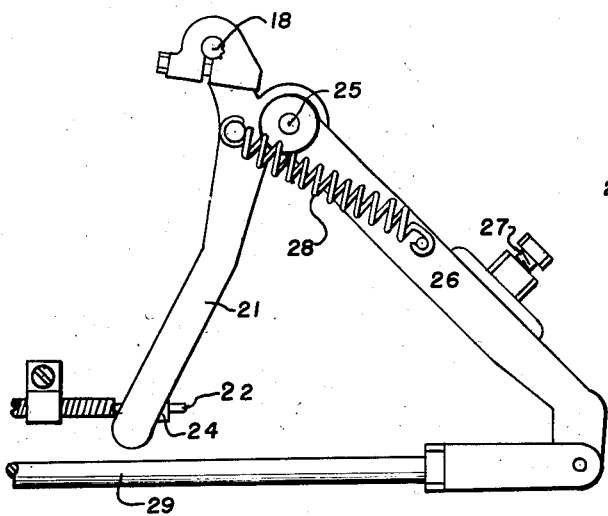
Figure 3:
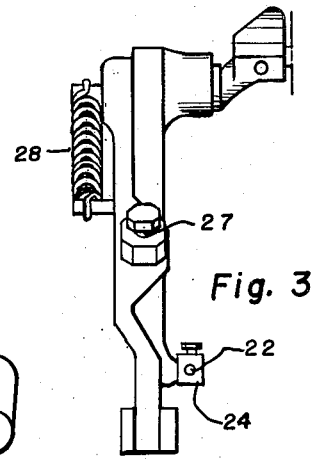
Figure 4:
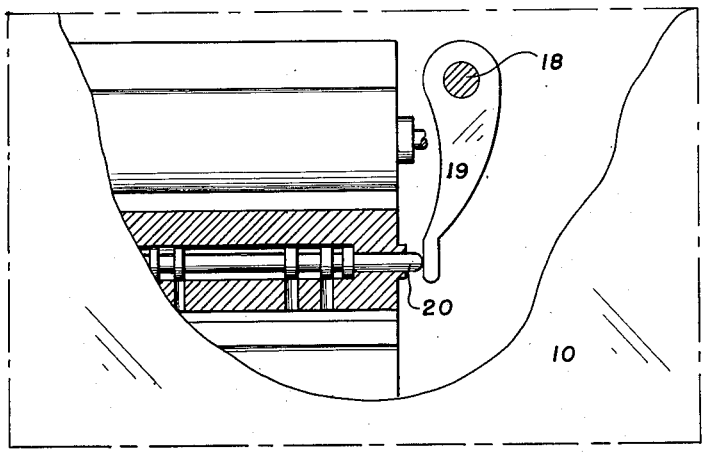
Figure 5:
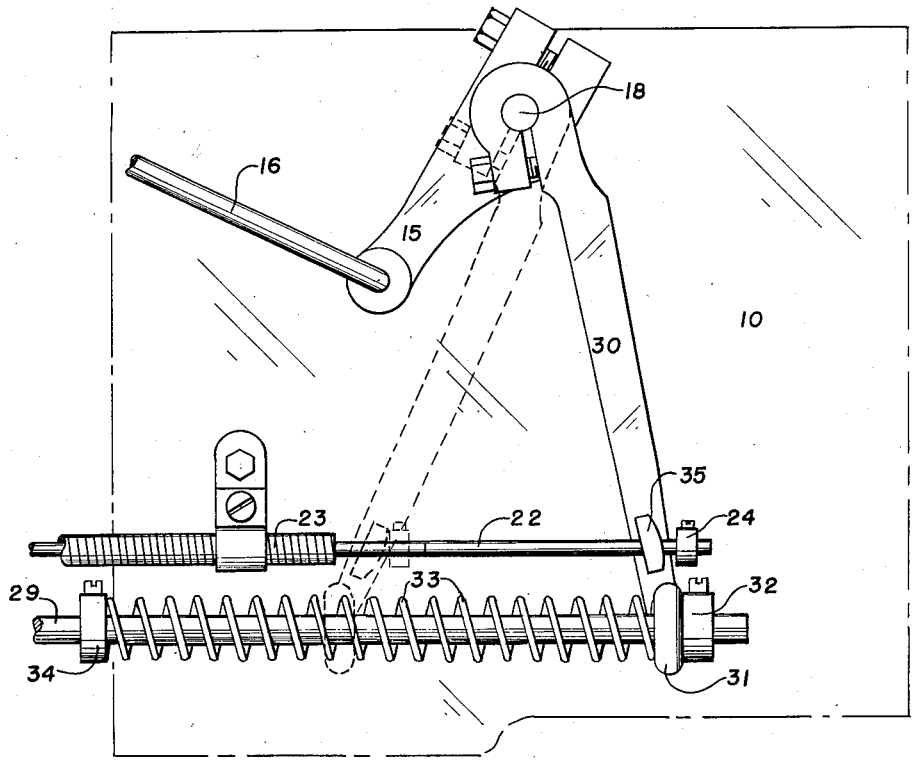

Figure 1 is a fragmentary, diagrammatic, plan view of a typical transmission as modified by the addition of my improved control, ready for use, a portion of the transmission cover being broken away to disclose interior elements reactive to the improved control. Figure 2 is an elevation, on an enlarged scale, of the improved control shown in, and as mounted on the transmission unit of, Figure 1. Figure 3 is an end view of the showing of Figure 2. Figure 4 is a fragmentary, detail section, on an enlarged scale, taken substantially on the indicated line 4—4 of Figure 1. Figure 5 is an elevation, on an enlarged scale, of an alternative construction and operative arrangement of the elements constituting the improved control. Figure 6 is a diagrammatic elevation of a prime mover and associated transmission unit furnished with a particular control linkage shown as modified to give effect to the principles of the instant invention. Figure 7 is a detail elevation, on an enlarged scale, of the linkage modifications pertinent to operative association of my improved control with the organization according to Figure 6. Figure 8 is a view similar to Figure 6 illustrating an alternative arrangement of the elements constituting the improved control as applied to the illustrated power organization and linkage. Figure 9 is a detail elevation, similar to Figure 7 and on an enlarged scale, of the significant linkage modifications shown in Figure 8.

Without particular regard to their structural details and operative relationships, none of which is essential to an understanding of the present invention, automatically operated transmissions take the power output of a prime mover and apply it, through selectively-engaged gear trains of differing ratios, to a driven shaft, the selection and operative engagement of an appropriate gear train being automatic, within certain limits determinable through the agency of a manual control wherewith the transmission unit is conventionally equipped, in reaction to factors of driven shaft speed and prime mover operating speed as reflected through the linkage determinative of prime mover throttle positions. The conventional manual control typical of such transmission units is selectively operable to regulate the unit mechanism for reverse drive of the driven shaft or for drive of said shaft in a normal direction within "high" or "low" operating ranges wherein selection of the appropriate engaged gear train ratio is an automatic function derived in part from the position of a rock-shaft reactive exteriorly of the unit to the linkage determinative of prime mover throttle position. Conventionally, such transmission units incorporated in automotive vehicles customarily provide four forward drive gear ratios through which the automatic selectivity of the apparatus ranges to maintain operative engagement of a gear train having a ratio appropriate to the driving conditions encountered, shift from lower road speeds to higher road speeds automatically occurring when the driven shaft attains a certain speed range and the throttle linkage is permitted to retract for reduction of the throttle opening serving the prime mover and consequent reduction in the operating speed of the latter. The automatic selectivity and operating controls of automatically operated transmission units are in general adequate and satisfactory to meet ordinary conditions of normal driving, but situations arising incident to driving in mountainous terrain, or over steep hills, emphasize certain deficiencies of unit control which are rectified by the supplementary control of the instant invention. Thus, with a conventional automatically operated transmission functioning normally during ascent of a steep grade, upward automatic shift of the gear train ratios will ensue as the vehicle speed progressively increases until the unit has engaged the train of the highest drive ratio, even though the load is too great for the prime mover to maintain at such ratio, with the result that the unit will automatically shift back and forth between engagement of said highest ratio gear train and engagement of the train having the next lower drive ratio, sacrificing the accelerative potential of the lower drive ratio just when most needed and robbing the vehicle operator of most significant, independent, operating control. The situation just mentioned is particularly aggravated when attempting to pass a slower-moving vehicle on a steep grade, as the automatic shift feature of the transmission very often functions to increase the gear drive ratio just as sufficient speed to pass has been built up, and such shift overloads the prime mover with immediate loss of road speed and acceleration, compelling abandonment of the attempt. Yet another particular situation develops when following a slow-moving vehicle on a steep grade, in which case the reduction of throttle feed to the prime mover and the consequent slowing of the latter brings about an automatic shift to the highest drive gear ratio wherein the prime mover has no accelerative reserve and hence no potential available when opportunity to pass arises. As is obvious, the deficiencies of the conventional transmission above discussed are manifest in the automatic upward shift from "third" or next-to-highest gear drive ratio to the highest gear drive ratio, and the instant invention is hence directed to the provision of a selectively-manipulated control arranged to bring into play certain characteristics of the conventional transmission whereby such upward shift may be obviated, thereby maintaining the unit in "third" gear drive ratio, while preserving full range of throttle control to the prime mover.

In the drawings, the numeral 10 designates a conventional automatically operated transmission equipped with a power input element 11 connectible with the output shaft of a prime mover 12, Fig. 6, and a power output element 13 connectible with the shaft to be driven. An open-ended sleeve 14 is journaled through one wall of the housing enclosing the transmission unit in perpendicular relation with the axis common to the elements 11 and 13 and carries an arm 15 fixed to and extending radially from its end exterior of the transmission housing to oscillate in a plane paralleling that of the adjacent housing wall, and a link 16 connects between the free end of the arm 15 and a manually-actuatable control within convenient reach of an operator, whereby said arm 15 may be set and held in various positions of angular adjustment corresponding with certain positions of sleeve 14 angular displacement relative to the intersected housing wall and operatively-related interior elements of the transmission. A detent 17 fixed to and extending radially from the sleeve 14 within the transmission housing is adapted to operatively engage with transmission elements, which it is not necessary to specify, which elements are thereby rendered responsive to sleeve 14 angular displacement. The sleeve 14, arm 15, link 16, and detent 17 comprise the usual manual control of conventional automatically operated transmissions which is selectively operable to determine the drive direction and operative ranges of the transmissions as above set forth.

Journaled for independent rotation coaxially with and through the sleeve 14, a rock-shaft 18 projects at each end beyond the sleeve ends and carries an arm 19 fixed to and projecting radially from its inner end, interiorly of the transmission housing, in operating engagement with an element 20 of the transmission shiftable to control the automatic gear ratio change of the unit, so that angular displacement of the rock-shaft 18 effective to move the arm 19 in one direction acts through said arm to correspondingly shift the element 20, while reverse oscillation of said rock-shaft and arm permits return of the element to its normal, unshifted position. The element 20 is a control element of the conventional transmission which, regardless of its other specific relationships, attributes, and functions, serves when in normal, unshifted position to permit automatic upshift from "third" to highest gear drive ratio under certain conditions of driven element speed reactive within the transmission, and inhibits or blocks such upshift when moved out of normal position through oscillation of the rock-shaft 18 and arm 19, it hence being possible to lock the transmission against the specified upshift by holding the element 20 in shifted and out of normal position. Conventionally, the outer end of the rock-shaft 18 is furnished with a radial arm fixed to its exterior end and operatively connected with the throttle control linkage of the prime mover in such manner as to actuate the rock-shaft in a direction to shift the element 20 out of normal position when the throttle is at or near its maximum opening and to permit said element 20 to return to normal position when the throttle is at or near its minimum opening, it thus being possible, in conventional installations, to block the automatic upshift from "third" to highest gear drive ratio by maintaining the throttle open and the prime mover operating at or near its maximum speed, such blocking of the upshift being accompanied by a total loss of prime mover manipulative control and speed flexibility.

All of the foregoing is typical of conventional automatically operated transmissions as commonly installed and used and is set forth merely as a background against which the operation and advantage of the instant invention may more clearly appear, the present invention residing in the concept and construction of means for the selective control of rock-shaft 18 position, and consequent regulation of the element 20 relative position, without impairment of normal prime mover control.

Giving effect to the principles of the invention, the novel means shown in Figures 1, 2 and 3 are adapted for use with many installations of the conventional transmissions as a simple, readily-installed substitute for the usual operating linkages between the prime mover throttle and rock-shaft 18. As shown, a rigid arm 21 is adjustably clamped at one end to and to extend radially from the exterior and of the rock-shaft 18 in a length preferably somewhat less than that of the conventional rock-shaft-actuating arm, and the free, depending end of said arm 21 slidably engages with the suitably-disposed end of a push-and-pull wire 22 leading through the customary sheath 23 from a usual adjustably-latchable control mounted within convenient reach of an operator, perhaps adjacent the means for actuating the link 16 of the conventional manual control. The end of the sheath 23 adjacent the arm 21 is suitably anchored to fixed elements of the installation in the oscillatory path of the arm 21 free end where it serves as a stop to limit oscillation of said arm in the direction effective through the rock-shaft 18 and its arm 19 to shift the element 20 out of normal position and into blocking relation with the automatic upshift hereinabove specified, said sheath end stop being located to permit the full desired shift of the element 20, and a stop block 24 adjustably clamped to the end of the wire 22 on the side of the arm 21 remote from the sheath 23 end serves to limit oscillation of said arm in a direction effective to permit return of the element 20 to normal position, the length of wire 22 projecting from the sheath 23 and the position of the block 24 being so adjusted as to provide a range of arm 21 oscillation sufficient to permit full, unrestrained return of the element 20 to its upshift-accommodating position. Thus, with the wire 22 manually positioned in its extreme projection relative to its sheath 23, the arm 21 is free to slide at its free end along said wire through the full oscillatory operative range of the rock-shaft 18, while manual retraction of the projected wire 22 within its sheath operates to swing said arm 21 to that limit of its oscillatory range which serves to hold the element 20 out of normal position and in blocking relation with the specified upshift, the latchable control for the wire 22 functioning to secure said wire in any position of its longitudinal adjustment. On and projecting outwardly from the arm 21 adjacent and spacedly paralleling the rock-shaft 18 exterior end, a pin 25 hingedly engages with one end of a rigid arm 26 thereby mounted to swing in an oscillatory plane closely paralleling that of the arm 21 on the side of the latter remote from the sheath 23 end, a stop 27 adjustably carried by the arm 26 being disposed to engage a side of the arm 21 and prevent the arm 26 from swinging past the former in the direction of the sheath 23 end, and a retractile coil spring 28 operatively engaging between fixed points of said arms 21 and 26 to yieldably hold the latter adjacent and with its stop 27 engaging the former. The arm 26 preferably has a length such as to dispose its free end below the corresponding end of the arm 21, and said arm 26 free end hingedly connects with a link 29 so connected with or included in the prime mover throttle linkage as to swing the arm 26 toward the sheath 23 and when the throttle is opened and away from said sheath end when the throttle is closed, the oscillatory range of the arm 26 deriving from the throttle linkage closely approximating the oscillatory range of the arm 21 between its stops.

With the arrangement shown and described, provision is made for normal, conventional operation and control of the transmission. The wire 22 of the supplementary control being projected from its sheath 23 to a maximum adjusted spacing of the stop block 24 from the sheath end, the spring 28 operates to hold the arm 26 with its stop 27 engaging the side of the arm 21, so that said arms 21 and 26 move together as throttle linkage actuation is reflected through the link 29, thereby oscillating the rock-shaft 18 in response to throttle manipulation in the same manner and to the same effect as conventional single-arm linkages, the free end of the arm 21 sliding on the projected wire 22 portion. When, however, it is desired to block the automatic upshift above specified, the wire 22 is manually retracted relative to its sheath and latched in such retracted position, thereby holding the arm 21 end against the sheath 23 end and maintaining the element 20 in blocking relation with said upshift, the arm 26 being now free to oscillate through the full operative range of the throttle linkage about its mounting on the pin 25, thus freeing the selective throttle control of the prime mover while inhibiting undesired transmission upshift.

The alternative arrangement of means represented by Figure 5 is in all essential operative respects identical with that shown in the preceding views and hereinabove described, the modification differing from the first disclosure in its use of a single rock-shaft-actuating arm in place of the two pivotally-associated arms 21 and 26. As shown in Figure 5, a single, rigid arm 30 is adjustably clamped at one end to the rock-shaft 18 exterior end and depends therefrom in a length sufficient for operative engagement with the link 29 connecting with the throttle linkage, said link 29 in this instance being disposed beneath and spacedly parallel to the sheath 23 end and wire 22 projection. The free end of the arm 30 is provided with a slide loop 31 sized to reciprocably accommodate the link 29 and the latter is provided with an adjustably-related stop 32 engageable by the loop 31 at times to limit arm 30 oscillation on said link in a direction away from the sheath 23 end, said loop 31 being normally and yieldably held against the stop 32 by means of a relatively-light, expansive coil spring 33 encircling the link in bearing engagement between the loop face remote from the stop 32 and a collar 34 adjustably secured to the link inwardly of the latter a distance exceeding the oscillatory range of the arm 30. An apertured lug 35 projecting from the arm 30 in spaced relation with the loop 31 slidably accommodates the wire 22 and provides an abutment against which the stop block 24 may act, while the end of the sheath 23, as before, functions to limit oscillation of the arm 30 theretoward. As should be apparent, the arm 30 is free to slide on the projected wire 22 between the sheath end and the stop 24 as it oscillates with and in response to reciprocation of the link 29, the loop 31 being held against the stop 32 by the spring 33, such arm oscillation acting through the rock-shaft 18 to shift and return the element 20 as above set forth, but when the wire 22 is manually retracted, said arm 30 is immobilized with the element 20 shifted to block undesired upshift and the spring 33 is compressed somewhat between the loop 31 and collar 34, but the link 29 is still free to react to throttle linkage manipulations, the light weight and length of the said spring preserving the necessary range of yieldability to avoid impairment of the prime mover throttle control.

As shown in Figures 6 and 8, certain conventional installations of automatically operated transmissions are arranged with the usual arm 36 for actuation of the rock-shaft 18 connected in and for movement with the throttle linkage through the agency of a bell-crank 37 pivotally mounted for oscillation through a vertical arc, one leg of said bell-crank substantially paralleling the arm 36 and being operatively engaged therewith by means of a link 38 while the other bell-crank leg is responsively included in the throttle linkage by means of a link 39, the arrangement being such as to reflect opening of the throttle through the links 38, 39 and bell-crank 37 as oscillation of the arm 36 and rock-shaft 18 in an upshift-inhibiting direction and closing of the throttle as reverse oscillation of said arm and rock-shaft, and such installations may conveniently be adapted to give effect to the principles of the instant invention through either of the alternative modifications illustrated and hereinafter described.

In the arrangement according to Figures 6 and 7, the link 38 engages positively and directly between the arm 36 and parallel leg of the bell-crank 37, while the link 39 connects with the other bell-crank leg through a slide coupling 40 spring-loaded to normally transmit throttle linkage travel directly to and through the bell-crank and resiliently yieldable when the bell-crank is immobilized to accommodate the throttle linkage travel. The end of the push-and-pull wire 22 projecting from the sheath 23 is slidably engaged through the bell-crank leg connected with the link 39 so that its stop block 24 engages the under side of said bell-crank leg when the latter is at that limit of its oscillatory range corresponding with an upshift-permitting position of the arm 36, and the end of the sheath 23 is anchored on the opposite side of the bell-crank leg to function as a stop limiting bell-crank leg oscillation in the direction of arm 36 upshift-inhibiting oscillation. Thus, with the wire 22 projected from its sheath 23, movement of the throttle linkage is reflected through the bell-crank and associated links as corresponding oscillation of the arm 36 productive of normal transmission operation, while when said wire is retracted within its sheath the bell-crank is rocked to and immobilized in a position that holds the arm 36 in upshift-inhibiting relation with the transmission, in which event the throttle linkage travel is accommodated in the spring-loaded coupling 40.

In the arrangement according to Figures 8 and 9, the link 39 connects positively and directly between the throttle linkage and the appropriate leg of the bell-crank 37, while the link 38 is furnished with the spring-loaded slide coupling 40 to provide for independent adjustment of the arm 36 relative to the normally parallel bell-crank leg, and the wire 22 slidably engages said arm 36 in the manner of the modification shown in Figure 5, the operation and functional effect of the elements constituting this arrangement being the same as that last above described.

Since changes, modifications, and variations in the particular form, construction, and arrangement of the elements constituting the improved supplementary control may be had without departing from the spirit of my invention, I wish to be understood as being limited solely by the scope of the appended claims, rather than by any details of the illustrative showing and foregoing description.

I claim as my invention:

1. A supplementary, selective, manual control for automatic transmissions having an exterior arm oscillatable about a fixed axis in direct reaction to throttle linkage travel to inhibit shift of the transmission from a lower and to a higher drive ratio in its position reflecting open throttle condition and to permit such transmission shift in its position reflecting closed throttle condition, said control comprising means selectively and manually operable to immobilize said arm in its shift-inhibiting position, and associated means for the automatic accommodation of otherwise arm-operating linkage travel when said arm is so immobilized, wherein the means operable to immobilize said arm in one of its positions comprises a manually extensible and retractible push-and-pull wire slidably engaging said arm and a stop block on said wire engageable against and to move said arm when said wire is retracted, and the means for accommodating throttle linkage travel during immobilization of said arm comprises a second arm hinged to and to oscillate in a plane paralleling that of said first arm with its free end connected to the throttle linkage, a stop on said second arm engageable with and to move said first arm when said wire is extended, and spring means yieldably interconnecting said arms in normal, stop-engaged proximity.

2. A supplementary, selective, manual control for automatic transmissions having an exterior arm oscillatable about a fixed axis in direct reaction to throttle linkage travel to inhibit shift of the transmission from a lower and to a higher drive ratio in its position reflecting open throttle condition and to permit such transmission shift in its position reflecting closed throttle condition, said control comprising means selectively and manually operable to immobilize said arm in its shift inhibiting position and associated means for the automatic accommodation of otherwise arm-operating linkage travel when said arm is so immobilized, wherein the means operable to immobilize said arm in one of its positions comprises a manually extensible and retractible push-and-pull wire slidably engaging said arm and a stop block on said wire engageable against and to move said arm when said wire is retracted, and the means for accommodating throttle linkage travel during immobilization of said arm comprises a spring-loaded slide coupling between said linkage and the arm free end.

3. A supplementary, selective, manual control for automatic transmissions having an exterior arm oscillatable about a fixed axis in direct reaction to throttle linkage travel to inhibit shift of the transmission from a lower and to a higher drive ratio in its position reflecting open throttle condition and to permit such transmission shift in its position reflecting closed throttle condition, said control comprising means selectively and manually operable to immobilize said arm in its shift-inhibiting position and associated means for the automatic accommodation of otherwise arm-operating linkage travel when said arm is so immobilized, wherein said arm is reactive to throttle linkage travel through the agency of a bell-crank and a link operatively connecting one of the bell-crank legs with the arm free end, the means operable to immobilize said arm in one of its positions comprises a manually extensible and retractible push-and-pull wire slidably engaging said arm and a stop block on said wire engageable against and to move said arm when said wire is retracted, and the means for accommodating throttle linkage travel during immobilization of said arm comprises a spring-loaded slide coupling between the bell-crank leg and the link connecting the latter with said arm.

4. A supplementary, selective, manual control for automatic transmissions having an exterior arm oscillatable about a fixed axis in direct reaction to throttle linkage travel to inhibit shift of the transmission from a lower and to a higher drive ratio in its position reflecting open throttle condition and to permit such transmission shift in its position reflecting closed throttle condition, said control comprising means selectively and manually operable to immobilize said arm in its shift-inhibiting position and associated means for the automatic accommodation of otherwise arm-operating linkage travel when said arm is so immobilized, wherein said arm is reactive to throttle linkage travel through the agency of a bell-crank and a link operatively connecting one of the bell-crank legs with the arm free end, the means operable to immobilize said arm in one of its positions comprises a manually extensible and retractible push-and-pull wire slidably engaging a bell-crank leg and a stop block on said wire engageable against and to move said leg when said wire is retracted, and the means for accommodating throttle linkage travel during immobilization of said arm and bell-crank comprises a spring-loaded slide coupling between the bell-crank leg and the member connecting the latter with the throttle linkage.

MARTIN C. KRUEGER.

REFERENCES CITED

The following references are of record in the file of this patent:

UNITED STATES PATENTS

| Number | Name | Date |
|---|---|---|
| 1,553,319 | Lardner | Sept. 15, 1925 |
| 1,922,634 | Pierce | Aug. 15, 1933 |
| 1,983,745 | Dolza | Dec. 11, 1934 |
| 2,071,292 | Woolson | Feb. 16, 1937 |
| 2,071,785 | Ehrlich | Feb. 23, 1937 |
| 2,103,540 | Livermore | Dec. 28, 1937 |
| 2,120,104 | Livermore | June 7, 1938 |
| 2,260,406 | Roche | Oct. 28, 1941 |
| 2,264,444 | Ljungstrom | Dec. 2, 1941 |
| 2,376,545 | Livermore | May 22, 1945 |